United States Patent [19]

Kansupada et al.

[11] Patent Number: 5,228,938
[45] Date of Patent: Jul. 20, 1993

[54] RUBBER SURFACE TREATMENT AND PRODUCTS DERIVED THEREFROM

[75] Inventors: Bharat K. Kansupada, Mogadore; James R. McCandless, Akron, both of Ohio

[73] Assignee: The Goodyear Tire & Rubber Company, Akron, Ohio

[21] Appl. No.: 713,918

[22] Filed: Jun. 12, 1991

[51] Int. Cl.$^5$ .............................................. C09J 5/02
[52] U.S. Cl. ............................... 156/307.3; 106/311; 156/308.6; 156/309.3; 252/364; 264/341; 264/343; 428/519; 524/476
[58] Field of Search ............... 156/307.3, 308.6, 309.3; 106/311; 264/341, 343; 252/364; 524/476; 428/519

[56] References Cited

U.S. PATENT DOCUMENTS 3,776,811 12/1973 Eckert et al. .................. 428/519

FOREIGN PATENT DOCUMENTS 158035 12/1982 German Democratic Rep.
56-30844 3/1981 Japan.

Primary Examiner—John J. Gallagher
Attorney, Agent, or Firm—Henry C. Young, Jr.

[57] ABSTRACT

The treatment of an uncured or partially cured rubber surface with a solvent mixture of n-heptane and specified hydrocarbon(s). The treatment is to add building tack. Cured adhesion can also be enhanced. An appropriate solvent mixture is provided. An article can be produced thereby as a cured assembly of rubber components.

4 Claims, No Drawings

RUBBER SURFACE TREATMENT AND PRODUCTS DERIVED THEREFROM

FIELD

This invention relates to solvent treating a rubber surface, and particularly an uncured rubber surface. The invention further relates to a method of fabricating rubber products with at least one component of a solvent-treated rubber surface, particularly an uncured rubber surface, and to products composed of such an assembly of rubber components.

BACKGROUND

Rubber products are often prepared by assembling a multiplicity of uncured rubber components, although sometimes a combination of uncured and cured rubber components is employed, which desirably requires them to have a somewhat tacky surface to enhance the stability of their assembly, followed by curing the resulting assembly under conditions of elevated temperature and pressure. Such tack is often referred to as building tack. The use of building tack in fabricating rubber products is well known to those skilled in such art. Usually building tack is used in the context of uncured rubber and, in this description, it is also used in the context of partially cured rubber. In this description, cured rubber is normally equated with partially cured rubber for the treatment purposes.

For such purpose, a conventional practice is to treat at least one of the uncured rubber surfaces with a solvent in order to both make the rubber surface tacky and, of a usually equal importance, to remove surface bloom from the rubber surface. Sometimes, the surface is treated with a rubber cement based on such solvent. The surface bloom is often in the form of various oils, fatty acid salts, antidegradants and waxes which have migrated to the surface of the rubber over a period of time and which often tend to inhibit a strong cure between the assembled rubber component surfaces.

Thus, in the description of this invention, for the treatment purposes, uncured rubber means uncured compounded rubber. Compounded rubber is used in a conventional sense, namely, for rubber which has been mixed with compounding ingredients.

While various aromatic solvents have heretofore demonstrated an ability to provide adequate building tack for uncured rubber surfaces, it is desired to provide an essentially aliphatic solvent for such surface treatment which has an adequate drying time, essentially eliminates or removes uncured rubber surface bloom, provides uncured rubber surface building tack, provides or enables an interfacial rubber surface adhesion after curing the rubber assembly and contains less than about one weight percent aromatic components.

Accordingly, it is desired to provide a solvent for such purposes which contains less than one weight percent and, thus is basically free, of aromatic materials such as, for example, benzene, alkyl substituted benzenes, xylene and alkyl substituted xylenes as designated aromatic and substituted aromatic hydrocarbons. It is also desired that it contains less than about one weight percent n-hexane or cyclohexane.

It is desirably required of such solvent that it effectively tackifies rubber surfaces, particularly uncured rubber surfaces, to provide adequate building tack so as to hold the rubber components together prior to curing the assembly and, further, to have a satisfactory short drying time in a practical application.

The solvent ability of a solvent is considered to be important for removing surface bloom from the rubber surface. It is believed that a suitable test for such solvent ability is a Kauri-Butanol (KB) test.

By experience, it is considered herein that a hydrocarbon solvent or solvent mixture having a KB value in a range of about 32 to about 38, preferably about 34 to about 36, is generally satisfactory for the solvency purposes of this invention.

The KB (Kauri-Butanol) values are conventionally determined by first dissolving 100 grams of Kauri Gum in 500 grams of butanol (thus, the designation KB). The desired solvent, or solvent mixture, is titrated into the KB solution to determine its KB value. KB values have been published in the literature for various aromatic and aliphatic hydrocarbon solvents. The KB value is, generally, an indication of the solubility of the Kauri Gum resin (contained in the butanol solution) in the solvent being tested.

For example, a KB value for toluene or benzene would be about 105–110; cyclohexane about 50; and heptane would be about 29.

A reference to the KB test may be found in "Physical And Chemical Examination of Paints, Varnishes, Lacquers And Colors", Eleventh Edition, 1950, pages 449–451, by Gardner and Sward, originally distributed by The Henry Gardner Laboratory, Inc., Bethesda, Md.

Various solvent systems were evaluated for use in treating uncured rubber to aid in the fabrication of rubber products.

Initially, heptane, an aliphatic $C_7$ hydrocarbon with a KB value of about 29, was evaluated. However, it was found to be inappropriate because its observed drying time was found to be unacceptable because it was too slow and it was observed to not provide adequate building tack for the treated uncured rubber surface.

However, n-heptane was considered to be a good solvent if it could be successfully blended with other hydrocarbons because of its nearly adequate drying time and its KB value.

Accordingly, it was decided to proceed to evaluate hydrocarbon solvent blends which had a heptane base for the rubber tackifying purposes, which would have the properties of an adequate drying time, bloom removal and the providing of an observed satisfactory building tack for a rubber surface, particularly an uncured rubber surface.

DISCLOSURE AND PRACTICE OF THE INVENTION

In accordance with this invention, a method of treating a rubber surface, preferably an uncured or partially cured rubber surface, and particularly as a method of adding tack, particularly building tack, to such surface, comprises treating at least one surface of a rubber article with a hydrocarbon solvent mixture and drying said treated surface; wherein said solvent has a KB value in the range of about 32 to about 38, preferably about 34 to about 36, has an aromatic hydrocarbon content of less than about one weight percent, and is comprised of a blend of (A) about 15 to about 25 parts by weight of n-heptane, and (B) about 50 to about 70 parts by weight of at least one of methylcyclohexane and cis 1,2- methylcyclopentane.

Said solvent can contain up to about 35, preferably up to about 20, percent by weight, based on the total solvent, of at least one other liquid $C_7$ and $C_8$ saturated alkyl (branched) aliphatic and/or alicyclic hydrocarbon. This refers to hydrocarbons which contain 7 or 8 carbon atoms, respectively. Such other saturated hydrocarbons can include, for example, 4-methylheptane, 3,4-dimethyl-hexane, 3-ethylhexane, 1,1-dimethylcyclohexane, t-1-methyl-3-ethylcyclopentane, t-1-methyl-2-ethylcyclo-pentane, 1-methyl-1-ethylcyclopentane, cis-1-methyl-2-ethylcyclopentane, 2,4-dimethylheptane and cis 1,2-dimethylcyclohexane, so long as the KB value requirement is met.

In one aspect, it is considered that component (B) of said solvent can be methylcyclohexane or cis 1,2methylcyclopentane.

In particular, such solvent contains less than one, and preferably less than 0.5, weight percent aromatic hydrocarbons, particularly of any of ethylbenzene, metaxylene, paraxylene, orthoxylene and cumene and of aliphatic and alicyclic hydrocarbons which contain more or less than the said 7–8 carbons, including n-hexane and cyclohexane. This restriction and characterization is intended to indicate and mean that one or more or all of such materials may not be present in the solvent or may be present up to the stated amount.

Thus, in one aspect of the invention, an aliphatic solvent, particularly for treating uncured or partially cured rubber, is the said hydrocarbon mixture having a KB value in the range of about 32 to about 38, preferably about 34 to about 36 and comprises a blend of (A) about 15 to about 25 parts by weight n-heptane, and (B) about 50 to about 70 parts by weight of at least one of methylcyclohexane and cis 1,2-methylcyclopentane.

As hereinbefore pointed out, such solvent can contain up to 35, preferably up to 20 percent by weight, based on the total solvent of said other $C_7$ and $C_8$ saturated alkyl aliphatic and/or alicyclic hydrocarbons.

As previously pointed out, the drying time of the solvent on the rubber surface (e.g. at 24° C.) is important in that it should be long enough for the solvent to have the desired and described effects and, also, to be short enough, on a practical basis, so that it suitably evaporates from the rubber surface treated rubber component(s) can be assembled in a relatively short time. In the practice of this invention, boiling point parameters (at normal atmospheric pressure) for such purpose have been found to be (i) an initial boiling point range of about 95° C. to about 102° C. and, (ii) a final dry point (flash distilling the solvent to a dry point) of about 102° C. to about 116° C.

It has been observed that a rubber surface with good building tack can be obtained together with adequate removal of surface bloom which results in assembled uncured rubber products demonstrating good uncured adhesion of the individual tackified components. The building tack relates to the force needed to pull apart, or separate, an uncured rubber component from another uncured rubber component or a partially cured rubber component before curing the assembly thereof. Building tack for assembling rubber components is well known to those having skill in such art.

Cured adhesion between the rubber components of the cured assembly thereof has also been found, in some cases, to be enhanced, apparently due to removal of the surface bloom and conditioning of the rubber surface by the solvent of this invention.

In another aspect of this invention, a method of producing a rubber product composed of a multiplicity of rubber components comprises treating a surface of an uncured or partially cured rubber component with the solvent required by this invention to remove surface bloom therefrom. As hereinbefore pointed out, such surface bloom typically consists of one or more of surface oils, fatty acid salts, antidegradants and waxes. As previously pointed out, such treatment has been observed to cause said surface to have building tack. Then, the treated rubber component is adhered to at least one additional rubber component and the resulting assembly is cured by submitting the assembly to conditions of elevated temperature and pressure.

Accordingly, a method of producing a rubber product is provided which comprises the steps of (A) treating a surface of a first curable rubber article with a hydrocarbon solvent to add building tack to the said treated surface and remove surface bloom therefrom, (B) adhering a second rubber article, selected from curable and cured rubber articles, to the said treated surface of the first rubber article to create an assembly thereof, and (C) submitting said assembly to rubber curing conditions of elevated temperature and pressure; wherein said surface of said first curable rubber article is treated with the hydrocarbon solvent of this invention.

As will be shown in the following results of the example contained herein, after considerable experimentation and evaluation, it is considered that the object of providing a novel solvent (mixture) and use thereof for treating uncured rubber surfaces with attendant requirements therefor have been accomplished.

In an additional aspect of this invention, the hydrocarbon solvent is in a form of a cement comprised of a mixture of said solvent and a solution and/or suspension of compounded rubber therein. In such case, the compounded rubber comprises from about 5 up to about 25 weight percent of the total of such cement mixture. Such cements are typically used as coatings on the uncured rubber surface to enhance building tack and cured adhesion between surfaces of rubber components in the cured assembly thereof. It is considered that the solvent component of the cement. proceeds to clean the uncured rubber of any bloom and adds building tack.

In such applications, the rubber surface is treated with the rubber cement and dried to remove the solvent before assembling the rubber components.

Rubber cements using the solvent of this invention have been observed to especially enhance such cured adhesion. The compounded rubber component of the cement is considered to contribute to such cured adhesion between the assembly of rubber components.

The uncured, or partially cured, rubber surface which is considered for treatment by the solvent blend of this invention, including said rubber cement, can be rubbers or blends of rubbers which are typically those which are sulfur curable in nature but, however, it is considered that peroxide cured rubbers or curable rubbers are also to be considered. Sometimes a combination of sulfur and resin cure systems are used for relatively low unsaturation rubbers such as butyl rubbers and EPDM rubbers. Such systems are well known to those having skill in such art.

Typically, butyl rubbers, which include halobutyl rubbers, and EPDM rubbers have little building tack unless especially compounded (mixed) with oils and tackifying oils. The solvent of this invention is particularly useful for removing surface bloom from the surface thereof and enhancing its building tack.

The rubber surface to be treated can also be an uncured high unsaturation diene derived rubber which may already have some degree of building tack.

As is as well known to those having skill in the rubber art, sulfur curable rubber blends are blends of rubbers which contain carbon-to-carbon double bonds which sulfur acts upon to create the cured rubber products. Usually such high unsaturation diene derived rubbers (carbon to carbon bond unsaturation) are selected from diene unit containing rubbers which may include, although not limited thereto, cis 1,4-polybutadiene, trans 1,4-polybutadiene, cis 1,4-polyisoprene, trans 1,4-polyisoprene, medium vinyl polybutadiene, styrene/butadiene copolymer rubbers, as well as chloroprene rubber. Low unsaturation rubbers may be selected, for example, from butyl and halobutyl rubbers and from EPDM rubbers.

The butyl rubbers are typically in the form of a copolymer of isobutylene with a minor amount of isoprene and it is further considered that such butyl rubbers may be halobutyl rubbers such as, in particular, chlorobutyl and bromobutyl rubbers.

The solvent of this invention, including its form as a rubber cement, is particularly useful for treating butyl rubber, including halobutyl rubber, compounds for adhering to high unsaturation rubber compounds followed by curing the resultant assembly.

The method of this invention can be used to aid in the assembly of rubber components for various articles including tires and industrial products, including belts and hoses.

It is to be appreciated that the uncured or partially cured rubber is typically a blend of the aforesaid rubber in combination with various compounding ingredients therefor which includes, for example; carbon black, zinc oxide, zinc stearate or stearic acid, antidegradants such as antioxidants and antiozonants, waxes-particularly microcrystalline waxes, silica and possibly couplers for the silica, resins, sulfur and cure accelerator(s).

In the description of this invention, the terms "uncured" and "partially cured" rubber are used. The terms are intended to relate to compounded rubber which is rubber mixed with appropriate compounding ingredients, including curatives. The term "partially cured" usually means rubber which is less than about 80% cured. In the practice of this invention, it is intended that the solvent and/or solvent-based rubber cement be used to treat uncured and/or partially cured compounded rubber compositions.

The practice of this invention is more illustrated shown in the following Examples in which the parts and the percentages are by weight unless otherwise indicated, although the invention is not to be limited to the Examples.

EXAMPLE I

Uncured rubber samples are prepared having a dimension of about 2.54 cm by about 15.2 cm and a thickness of about 0.16 cm.

The uncured rubber samples and identified as Exp. A and Exp. B and were comprised of the following ingredients shown in Table 1.

TABLE 1

| Material | Parts | |
|---|---|---|
| | Exp A | Exp B |
| Bromobutyl Rubber | 90 | 0 |
| Natural Rubber or Polyisoprene | 10 | 70 |
| SBR Rubber | 0 | 30 |
| Carbon Black | 55 | 50 |
| Resin, Phenolic[1] | 5[2] | 4[3] |
| Process Oil | 6 | 17 |

[1]Phenol formaldehyde resin.
[2]Reactive.
[3]Non-reactive.

Conventional amounts of zinc oxide, zinc stearate and other zinc salts of fatty acids, accelerator(s) and sulfur were used, except for low sulfur for Exp. A.

Solvent blends were evaluated by treating the surface of an uncured sample of the composition of Exp. A with the solvent shown in the following Table 2.

TABLE 2

| Hydrocarbon | Parts Solvent A[1] |
|---|---|
| N-Heptane | 20 |
| Methylcyclohexane and/or cis 1,2-dimethylcyclopentane | 57 |
| Other hydrocarbons | 23[1] |

[1]Comprised of 1,1,3-trimethylcyclopentane (3.7%), ethylcyclopentene and/or 2,5-dimethylhexane (3.9%), trans 1,2-cis-4-trimethylcyclopentene (2.6%), as dominate constituents.

The rubber sample Exp. A identified in Table 1 herein was treated by applying by swab a thin film of the solvent of Table 2 to its surface at a temperature of about 24° C. followed by allowing the surface to dry for about 1-2 minutes at about 24° C. The drying time for the solvent on the rubber surface was considered to be adequate.

The surface of the treated rubber was observed to have building tack and further visually appeared as clean. Thus, any bloom on the surface of the sample had been removed.

An untreated and uncured rubber sample (Exp. B) was then pressed against the surface of the treated rubber sample Exp. A The assembly was evaluated for adhesion of sample Exp. B to treated sample Exp. A by measuring the force to pull them apart at a 90° angle on an Instron Tester at a crosshead speed of 5 inches (12.7 cm) per minute.

Such an assembly of Exp. A and Exp. B was also cured under conditions of elevated temperature (150° C.) and pressure.

The cured adhesion of Exp. B to Exp. A was measured by the same type of test except that the samples were pulled apart at a 180° angle at a crosshead speed of 20 inches (50.8 cm) per minute.

The test results are summarized in the following Table 3.

TABLE 3

| Assembly | Adhesion |
|---|---|
| Uncured | 10.5 Newtons |
| Cured | 25 Newtons |

Thus, these experiments demonstrate that good and acceptable building tack (uncured assembly) and cured adhesion (cured assembly) was obtained. This is considered successful for building rubber products.

EXAMPLE II

Rubber samples were prepared as in Example I. The rubbers were compounded according to Table 4. The samples are identified herein as Exp. C and Exp. D.

TABLE 4

| Material | Parts | |
|---|---|---|
| | Exp C | Exp D |
| Natural Rubber | 100 | 50 |
| Polybutadiene Rubber | 0 | 50 |
| Carbon Black | 38 | 45 |
| Silica | 17 | 0 |
| Zinc Oxide | 10 | 5 |
| Oil | 0 | 6 |
| Tackifying Phenolic Resin | 3 | 0 |
| Wax | 0 | 2 |

Conventional amounts of antidegradants, stearic acid, accelerator(s) and sulfur were used in Exp. C and Exp. D.

Sample Exp. C was submitted to partial cure conditions of elevated temperature and pressure.

While the phenolic resin is added to the rubber compound (Exp. C) to enhance its building tack, such tack is normally relatively rapidly lost due to the aforesaid formation of rubber surface bloom, although in this example, Exp. C is utilized before an extensive surface bloom is formed. In the specific case of Exp. C, building tack is also lost due to its partial pre-cure treatment.

After cooling the partially cured sample Exp. C to about 24° C., its surface was treated with the solvent of Table 2 and dried for a few minutes at about 24° C.

The treated surface of Exp. C was observed to have building tack and looked clean and the drying time was considered to be adequate.

Samples Exp. C and Exp. D were pressed together.

Adhesion tests were made of the uncured assembly in a manner described in Example I and found to be 12.5 Newtons which is considered to be a good and acceptable building tack.

While certain representative embodiments and details have been shown for the purpose of illustrating the invention, it will be apparent to those skilled in this art that various changes and modifications may be made therein without departing from the spirit or scope of the invention.

What is claimed is:

1. A method of producing a rubber product which comprises the steps of (A) treating a surface of a first curable rubber article with a hydrocarbon solvent to add building tack to said treated surface and remove surface bloom therefrom, (B) adhering a second rubber article, selected from curable and cured rubber articles, to the said treated surface of the first rubber article to create an assembly thereof, and (C) submitting said assembly to rubber curing conditions of elevated temperature and pressure; wherein said hydrocarbon solvent has a KB value in a range of about 32 to about 38, has an aromatic hydrocarbon content of less than about one weight percent and is comprised of (i) about 15 to about 25 parts by weight of n-heptane, and (ii) about 50 to about 70 parts by weight of at least one of methylcyclohexane and cis 1,2-methylcyclopentane; and wherein said curable and cured rubber articles are of a rubber selected from at least one of butyl rubber, halobutyl rubber, EPDM rubber and high unsaturation diene derived rubber compounds.

2. The method of claim 1 wherein the said hydrocarbon solvent for treating the said rubber article also contains up to about 35 percent by weight, based on the total solvent, of at least one additional liquid saturated alkyl aliphatic and/or alicyclic hydrocarbon having from 7 to 8 hydrocarbons so long as the KB value of the said solvent is in the said range of about 32 to about 38, and where said solvent mixture contains less than one weight percent, based on the total solvent, of hydrocarbons selected from n-hexane and cyclohexane and has a boiling point in a range of about 95° C. to about 102° C.

3. The method of claim 1 wherein the said hydrocarbon solvent for treating the said rubber article is in a form of a cement composed of a mixture of said solvent and a solution and/or suspension of compounded rubber therein.

4. The method of claim 2 where the said hydrocarbon solvent for treating the said rubber article is in a form of a cement composed of the said solvent and a solution and/or suspension of compounded rubber therein.

* * * * *